United States Patent
Ochs et al.

(10) Patent No.: US 6,732,010 B1
(45) Date of Patent: May 4, 2004

(54) METHOD, SYSTEM, AND PRODUCT FOR ASSOCIATING SUBCOMPONENTS WITH A PARTICULAR STORAGE LIBRARY

(75) Inventors: Steven Ochs, Louisville, CO (US);
Antonio Borrego, Superior, CO (US);
Don Wait, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/329,169

(22) Filed: Dec. 24, 2002

(51) Int. Cl.[7] ................................................. G06F 7/00
(52) U.S. Cl. ........................................ 700/214; 700/215
(58) Field of Search ................................. 700/213, 214, 700/215

(56) References Cited

U.S. PATENT DOCUMENTS

| | | | | |
|---|---|---|---|---|
| 5,894,461 A | * | 4/1999 | Fosler et al. ............. | 369/30.31 |
| 5,943,688 A | * | 8/1999 | Fisher et al. ............. | 711/162 |
| 6,314,338 B1 | * | 11/2001 | Billington ................ | 700/215 |
| 6,535,790 B2 | * | 3/2003 | Nakano et al. ........... | 700/214 |
| 6,591,164 B1 | * | 7/2003 | Plutt et al. ................ | 700/214 |

\* cited by examiner

Primary Examiner—Gene O. Crawford
(74) Attorney, Agent, or Firm—Carstens, Yee & Cahoon, L.L.P.

(57) ABSTRACT

A system, method, and product are disclosed for associating subcomponents with a storage library. A unique identifier is stored in a particular storage library. Each subcomponent that is a part of the particular storage library is then associated with the particular storage library by storing a copy of the unique identifier within each subcomponent. In order for a subcomponent to be usable by a particular storage library, the particular storage library's unique identifier must be stored within the subcomponent.

36 Claims, 3 Drawing Sheets

METHOD, SYSTEM, AND PRODUCT FOR ASSOCIATING SUBCOMPONENTS WITH A PARTICULAR STORAGE LIBRARY

BACKGROUND OF THE INVENTION

1. Field of the Invention

The present invention relates to automated storage device library systems, and more particularly to an automated storage device library system for associating library subcomponents with a particular storage library.

2. Background of the Invention

Existing automated storage libraries are capable of storing and retrieving large quantities of information stored on media cartridges. This is accomplished by the use of a large number of cartridge storage cells, each of which houses a media cartridge, that are housed within an enclosure. Such storage libraries use a robotic mechanism or picker to move the media cartridges between their media cartridge storage cells and media cartridge players. For example, to retrieve information stored on a selected media cartridge, a robotic mechanism moves to a location opposite the media cartridge storage cell that houses the selected media cartridge. An end effector of the robotic mechanism then grasps the media cartridge and extracts it from the media cartridge storage cell to a media drive where the end effector loads the media cartridge into the drive.

A storage library includes one or more subcomponents, such as robots, storage drives, pass-through-ports, cartridge access ports, circuit cards, and/or other devices. These subcomponents may be removed from one storage library and inserted into another storage library.

As older storage libraries are decommissioned, the possibility exists for used components to be placed into service as replacement spares. A method to ensure the integrity of replacement components is needed to protect the customer and the reputation of the automation vendor.

Therefore, a need exists for a method, system, and product for associating hardware subcomponents with a particular storage library to ensure that factory certified components are placed into service in automated storage libraries.

SUMMARY OF THE INVENTION

A system, method, and product are disclosed for associating subcomponents with a storage library. A unique identifier is stored in a particular storage library. Each subcomponent that is a part of the particular storage library is then associated with the particular storage library by storing a copy of the unique identifier within each subcomponent. In order for a subcomponent to be usable by a particular storage library, the particular storage library's unique identifier must be stored within the subcomponent.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures. The present invention is a system, method, and computer program product for associating subcomponents with a particular storage library.

A unique identifier is first stored in a particular storage library. This unique identifier is then used to associate components with the particular storage library. Each subcomponent that is a part of the particular storage library will have a copy of the unique identifier stored within the subcomponent. Thereafter, the storage library will periodically check to compare an identifier that is stored within each subcomponent with the unique identifier that is stored within the storage library to determine whether the components that are coupled to the storage library are associated with that storage library. If a subcomponent does not include a copy of the storage library's unique identifier, a determination is made that the subcomponent is not associated with the storage library. When a subcomponent is not associated with the storage library, the subcomponent will be flagged and thus prohibited from use by the storage library.

A generic "seal" may be stored within a subcomponent. This seal will permit the use of the subcomponent by any storage library. When the seal expires, the storage library to which the subcomponent is coupled will overwrite the seal with the unique identifier of that storage library. At that time the subcomponent becomes associated with that particular storage library. The subcomponent may then be used only by that particular storage library.

Figure 1A:
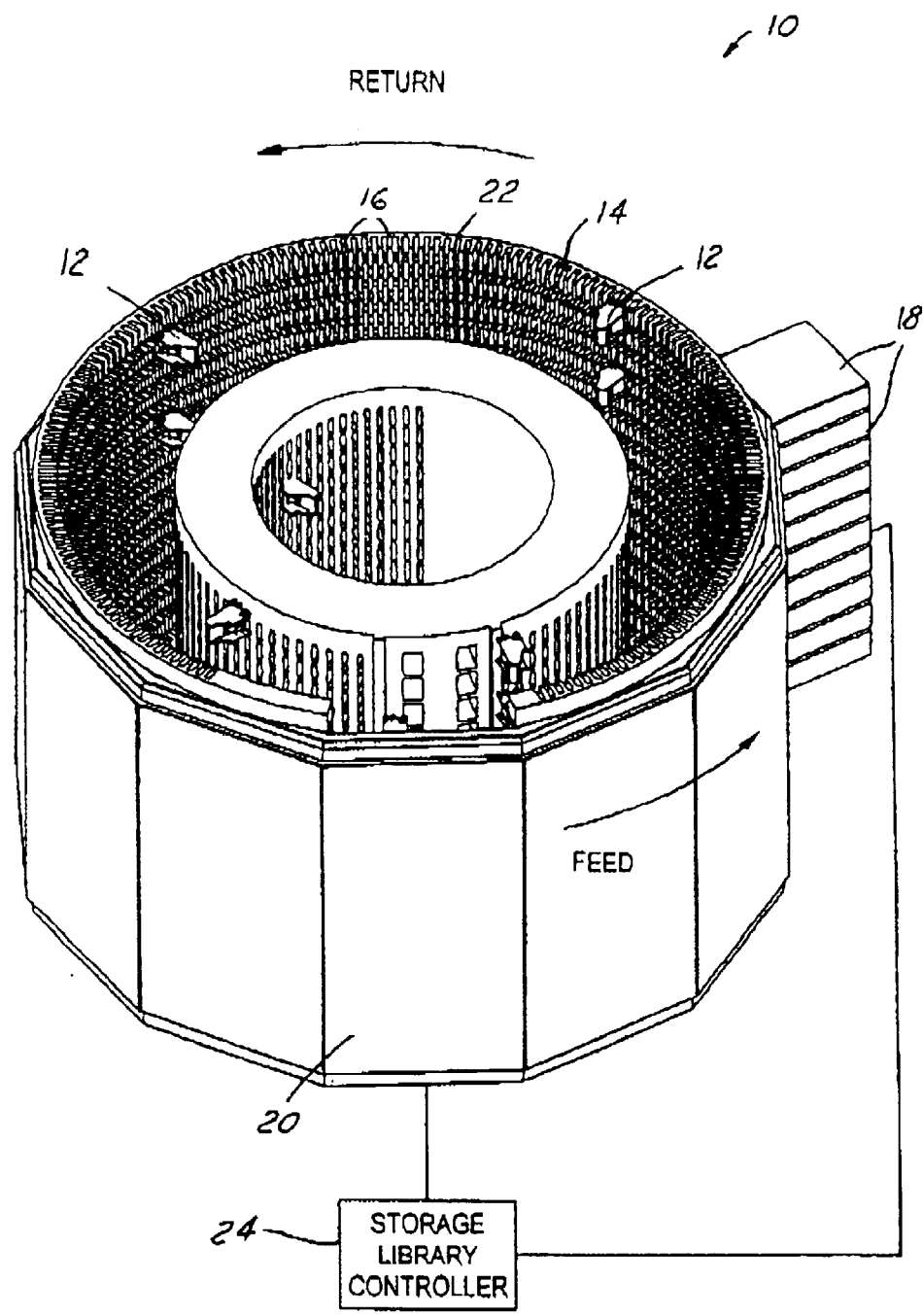
FIG. 1A depicts a perspective view of an automated storage library in accordance with the present invention.

Referring now to FIG. 1A, a round storage library 10 for use with the method and system of the present invention is shown. Storage library 10 includes multiple independent robotic mechanisms 12 to enable storage library 10 to concurrently manipulate different media cartridges 14. Storage library 10 includes a concentric array of media cartridge storage cells 16 and media cartridge players 18 mounted in a frame 20. A system of tracks or rails 22 guide robotic mechanisms 12 through all of the locations in the array. A storage library control unit (controller) 24 provides commands to robotic mechanisms 12 to manipulate media cartridges 14.

Figure 1B:
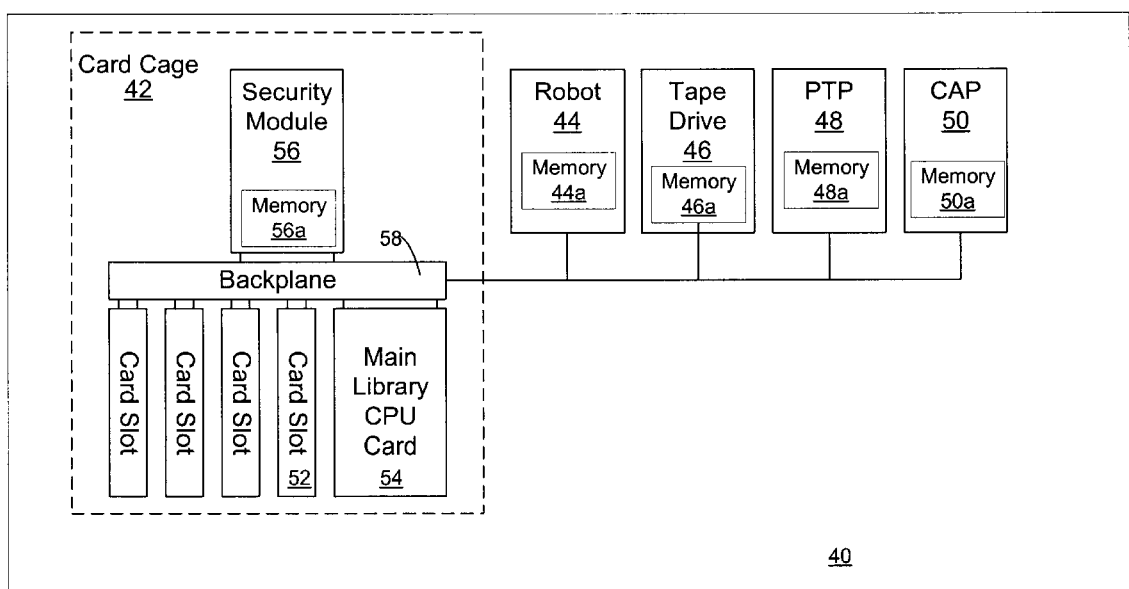
FIG. 1B illustrates a block diagram of electronic components included in the automated storage library of FIG. 1a in accordance with the present invention.

FIG. 1B illustrates a block diagram of electronic components 40 of the automated storage library 10 of FIG. 1a in accordance with the present invention. Components 40 includes a card cage 42 which is coupled to one or more subcomponents included in library 10. For example, the subcomponents may include one or more robots 44, one or more storage drives such as tape drives 46, one or more pass-through-ports (PTP) 48, one or more cartridge access ports (CAP) 50, a circuit card (not shown) inserted into a card slot, such as slot 52, multiple different circuit cards in card cage 42, or other devices. Any device that includes a memory capable of storing an identifier may be considered to be a "subcomponent".

Card cage 42 includes multiple card slots, such as card slot 52, a main library central processing unit (CPU) card 54, and a security module 56 coupled together utilizing a backplane 58.

Security module 56 includes a nonvolatile memory 56a. Each subcomponent also includes a memory, such as a non-volatile, for storing an identifier. For example, robot 44 includes memory 44a. Tape drive 46 includes memory 46a. PTP 48 include memory 48a. And, CAP 50 includes memory 50a. The memory may be any kind of memory, such as a non-volatile memory, an NVRAM, a flash, or any other kind of storage.

During the manufacturing process, a unique storage library identifier, also referred to herein as a frame identifier, is stored in memory 56a. This unique frame identifier identifies the particular storage library which includes the particular frame. For example, the frame's serial number may be used as the unique frame identifier. The frame identifier may be encrypted or otherwise protected from tampering.

Therefore, a frame that is part of a particular storage library will include a particular unique identifier. Each subcomponent that is included as part of that particular storage library will include stored within the memory of the subcomponent a copy of the library's frame identifier. In this manner, each subcomponent becomes associated with a particular frame, and thereby with a particular storage library.

Periodically, the main library CPU 54 will interrogate each subcomponent to verify that the subcomponent is part of this particular storage library. For example, when a subcomponent is inserted into the library, the library will automatically detect the presence of the subcomponent and will interrogate it to determine if the subcomponent includes the library's unique identifier or a seal (described below).

If a subcomponent is not part of this particular storage library, the subcomponent will be flagged as being invalid which will prohibit its use as part of the particular storage library. All subcomponents that include the frame identifier, and thus are associated with this storage library, may be utilized by the storage library.

A use identifier is initially stored in the memory of each subcomponent during the manufacturing process. This use identifier is referred to herein as a "freshness seal" or "seal". The seal is a generic identifier that has an associated expiration. Subcomponents that include a seal that has not expired may be used by any storage library. When the main library CPU 54 interrogates a subcomponent, if its seal has expired, CPU 54 will overwrite the seal by storing a copy of the unique frame identifier in the subcomponent's memory. The subcomponent becomes associated with a particular storage library when the subcomponent's seal is overwritten with a copy of the storage library's unique frame identifier.

Figure 2:
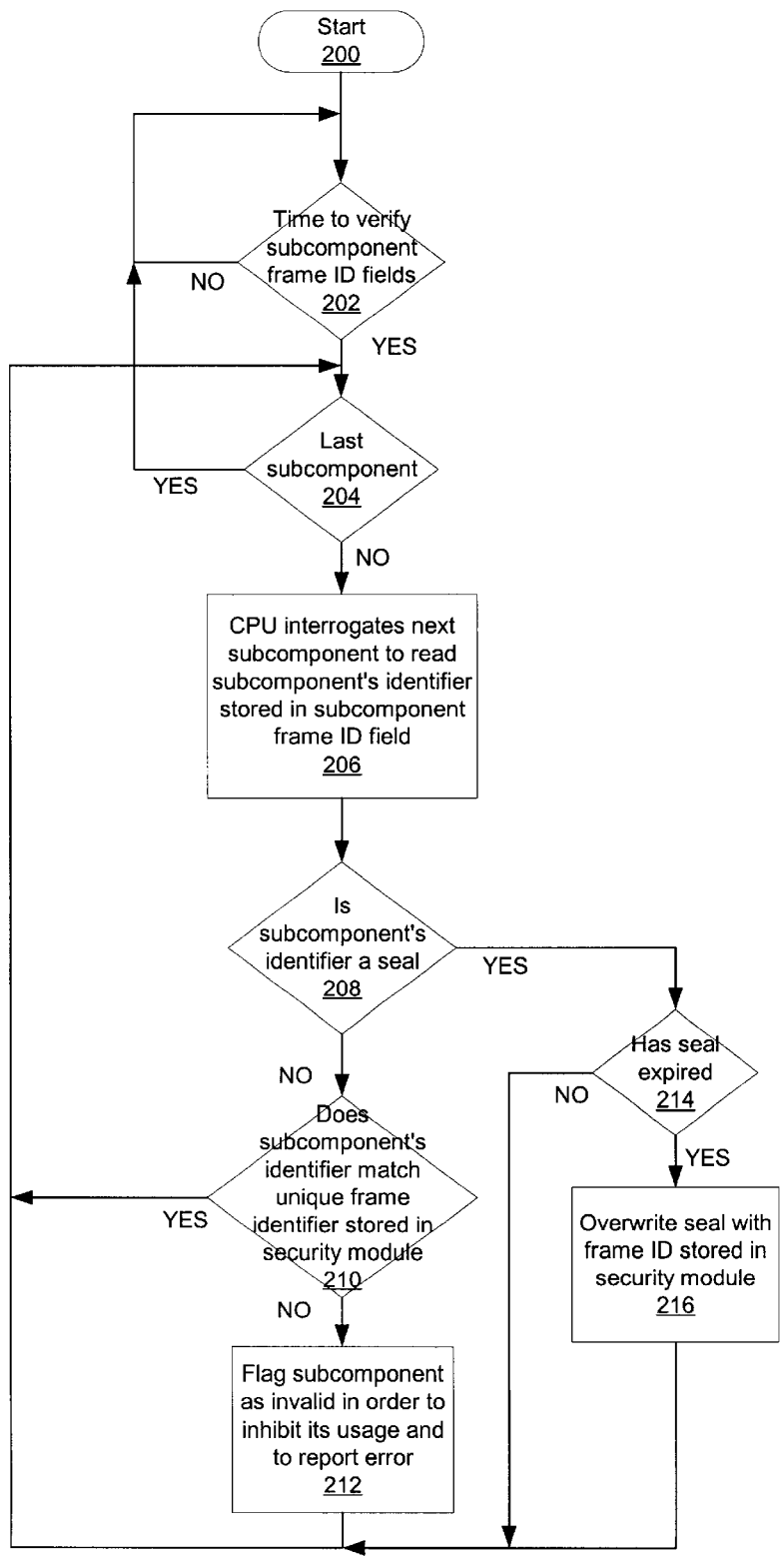
FIG. 2 depicts a high level flow chart which illustrates associating subcomponents with a particular automated storage library in accordance with the present invention.

FIG. 2 depicts a high level flow chart which illustrates associating subcomponents with a particular tape automation system in accordance with the present invention. The process starts as depicted by block 200 and thereafter passes to block 202 which illustrates a determination of whether or not it is time to verify the subcomponents' frame identifier fields in each subcomponent. If a determination is made that it is not time to verify the subcomponent frame identifier fields, the process passes back to block 202. Referring again to block 202, if a determination is made that it is time to verify the subcomponent frame identifier fields, the process passes to block 204.

Block 204 illustrates a determination of whether or not this is the last subcomponent to verify. If a determination is made that this is the last subcomponent to verify, the process passes back to block 202. Referring again to block 204, if a determination is made that this is not the last subcomponent to verify, the process passes to block 206 which depicts the processor, or CPU, interrogating a next subcomponent to read the subcomponent's identifier that is stored in the subcomponent's frame identifier field. Next, block 208 illustrates a determination of whether or not the identifier is a seal. If a determination is made that the identifier is not a seal, the process passes to block 210.

Block 210 depicts a determination of whether or not this subcomponent's identifier matches the unique frame identifier that is stored in the security module. If a determination is made that the identifier does match the unique frame identifier, the process passes back to block 204. Referring again to block 210, if a determination is made that the identifier does not match the unique frame identifier, the process passes to block 212 which illustrates the CPU flagging this subcomponent as invalid in order to inhibit the subcomponent's usage and to report an error. The process then passes back to block 204.

Referring again to block 208, if a determination is made that the subcomponent's identifier is a seal, the process passes to block 214 which illustrates a determination of whether or not the seal has expired. If a determination is made that the seal has not expired, the process passes back to block 204. If a determination is made that the seal has expired, the process passes to block 216 which depicts the CPU overwriting the seal in the subcomponent's field with the unique frame identifier that is stored in the security module. The process then passes back to block 204.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for associating subcomponents with a storage library, said method comprising the steps of:
   storing a unique identifier in said storage library; and
   associating each subcomponent included within said storage library with said storage library by storing a copy of said unique identifier within each said subcomponent.

2. The method according to claim 1, further comprising the step of:
   storing said unique identifier in a security module in said storage library.

3. The method according to claim 1, further comprising the step of:

storing said unique identifier in said storage library during a manufacturing of said storage library.

4. The method according to claim 1, further comprising the steps of:
   detecting an insertion of a first subcomponent into said storage library; and
   verifying that said first subcomponent is associated with said storage library utilizing an identifier that is stored in said first subcomponent in response to said detection.

5. The method according to claim 1, further comprising the step of:
   wherein only subcomponents that include said unique identifier may be utilized by said storage library.

6. The method according to claim 1, further comprising the step of:
   associating a robot that is included within said storage library with said storage library by storing a copy of said unique identifier within said robot.

7. The method according to claim 1, further comprising the step of:
   associating a pass-through-port that is included within said storage library with said storage library by storing a copy of said unique identifier within said pass-through-port.

8. The method according to claim 1, further comprising the step of:
   associating a storage drive that is included within said storage library with said storage library by storing a copy of said unique identifier within said storage drive.

9. The method according to claim 1, further comprising the step of:
   verifying that a first subcomponent is associated with said storage library utilizing an identifier that is stored in said first subcomponent.

10. The method according to claim 9, further comprising the steps of:
    comparing said identifier that is stored in said first subcomponent with said unique identifier;
    in response to a determination that said identifier that is stored in said first subcomponent is said unique identifier, determining that said first subcomponent is associated with said storage library and permitting said first subcomponent's use by said storage library; and
    in response to a determination that said identifier that is not stored in said first subcomponent is said unique identifier, determining that said first subcomponent is not associated with said storage library and prohibiting said first subcomponent's use by said storage library.

11. The method according to claim 1, further comprising the steps of:
    storing an electronic seal identifier having an expiration time in a first subcomponent during a manufacturing of said first subcomponent;
    utilizing said first subcomponent within said storage library until said expiration time occurs;
    in response to said expiration time occurring, associating said first subcomponent with said storage library, wherein said first subcomponent can be used only by said storage library after said first subcomponent is associated with said storage library; and
    said first subcomponent capable of being utilized with any storage library until said expiration time occurs.

12. The method according to claim 11, further comprising the step of:
    in response to said expiration time occurring, associating said first subcomponent with said storage library by overwriting said seal with said unique identifier.

13. A system for associating subcomponents with a storage library, said system comprising:
    a unique identifier that is stored in said storage library; and
    said unique identifier for associating each subcomponent included within said storage library with said storage library by storing a copy of said unique identifier within each said subcomponent.

14. The system according to claim 13, further comprising:
    a security module included in said storage library for storing said unique identifier.

15. The system according to claim 13, further comprising:
    said unique identifier being stored in said storage library during a manufacturing of said storage library.

16. The system according to claim 13, further comprising:
    detection means for detecting an insertion of a first subcomponent into said storage library; and
    said storage library including a CPU for verifying that said first subcomponent is associated with said storage library utilizing an identifier that is stored in said first subcomponent in response to said detection.

17. The system according to claim 13, further comprising:
    wherein only subcomponents that include said unique identifier may be utilized by said storage library.

18. The system according to claim 13, further comprising:
    said subcomponent being a robot that is included within said storage library with said storage library, wherein a copy of said unique identifier is stored within said robot.

19. The system according to claim 13, further comprising:
    said subcomponent being a storage drive that is included within said storage library with said storage library, wherein a copy of said unique identifier is stored within said storage drive.

20. The system according to claim 13, further comprising:
    said subcomponent being a pass-through-port that is included within said storage library with said storage library, wherein a copy of said unique identifier is stored within said pass-through-port.

21. The system according to claim 13, further comprising:
    verifying means for verifying that a first subcomponent is associated with said storage library utilizing an identifier that is stored in said first subcomponent.

22. The system according to claim 21, further comprising:
    said storage library including a CPU for comparing said identifier that is stored in said first subcomponent with said unique identifier;
    in response to a determination that said identifier that is stored in said first subcomponent is said unique identifier, said CPU for determining that said first subcomponent is associated with said storage library and permitting said first subcomponent's use by said storage library; and
    in response to a determination that said identifier that is not stored in said first subcomponent is said unique identifier, said CPU for determining that said first subcomponent is not associated with said storage library and prohibiting said first subcomponent's use by said storage library.

23. The system according to claim 13, further comprising:
    an electronic seal identifier being stored in a first subcomponent during a manufacturing of said first subcomponent, said seal having an associated expiration time;

said first subcomponent capable of being utilized within said storage library until said expiration time occurs;

in response to said expiration time occurring, associating means for associating said first subcomponent with said storage library, wherein said first subcomponent can be used only by said storage library after said first subcomponent is associated with said storage library; and said first subcomponent capable of being utilized with any storage library until said expiration time occurs.

24. The system according to claim 23, further comprising:

in response to said expiration time occurring, associating means for associating said first subcomponent with said storage library by overwriting said seal with said unique identifier.

25. A computer program product for associating subcomponents with a storage library, said product comprising:

instruction means for storing a unique identifier in said storage library; and instruction means for associating each subcomponent included within said storage library with said storage library by storing a copy of said unique identifier within each said subcomponent.

26. The product according to claim 25, further comprising:

instruction means for storing said unique identifier in a security module in said storage library.

27. The product according to claim 25, further comprising:

instruction means for storing said unique identifier in said storage library during a manufacturing of said storage library.

28. The product according to claim 25, further comprising:

instruction means for detecting an insertion of a first subcomponent into said storage library; and instruction means for verifying that said first subcomponent is associated with said storage library utilizing an identifier that is stored in said first subcomponent in response to said detection.

29. The product according to claim 25, further comprising:

wherein only subcomponents that include said unique identifier may be utilized by said storage library.

30. The product according to claim 25, further comprising:

instruction means for associating a robot that is included within said storage library with said storage library by storing a copy of said unique identifier within said robot.

31. The product according to claim 25, further comprising:

instruction means for associating a pass-through-port that is included within said storage library with said storage library by storing a copy of said unique identifier within said pass-through-port.

32. The product according to claim 25, further comprising:

instruction means for associating a storage drive that is included within said storage library with said storage library by storing a copy of said unique identifier within said storage drive.

33. The product according to claim 25, further comprising:

instruction means for verifying that a first subcomponent is associated with said storage library utilizing an identifier that is stored in said first subcomponent.

34. The product according to claim 33, further comprising:

instruction means for comparing said identifier that is stored in said first subcomponent with said unique identifier;

in response to a determination that said identifier that is stored in said first subcomponent is said unique identifier, instruction means for determining that said first subcomponent is associated with said storage library and permitting said first subcomponent's use by said storage library; and in response to a determination that said identifier that is not stored in said first subcomponent is said unique identifier, instruction means for determining that said first subcomponent is not associated with said storage library and prohibiting said first subcomponent's use by said storage library.

35. The product according to claim 25, further comprising:

instruction means for storing an electronic seal identifier having an expiration time in a first subcomponent during a manufacturing of said first subcomponent;

instruction means for utilizing said first subcomponent within said storage library until said expiration time occurs;

in response to said expiration time occurring, instruction means for associating said first subcomponent with said storage library, wherein said first subcomponent can be used only by said storage library after said first subcomponent is associated with said storage library; and said first subcomponent capable of being utilized with any storage library until said expiration time occurs.

36. The product according to claim 35, further comprising:

in response to said expiration time occurring, instruction means for associating said first subcomponent with said storage library by overwriting said seal with said unique identifier.

* * * * *